(12) United States Patent
Barnes et al.

(10) Patent No.: US 6,272,542 B1
(45) Date of Patent: Aug. 7, 2001

(54) METHOD AND APPARATUS FOR MANAGING DATA PUSHED ASYNCHRONOUSLY TO A PERVASIVE COMPUTING CLIENT

(75) Inventors: Stacey Alan Barnes, Round Rock; Christian Lita, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,204

(22) Filed: Dec. 10, 1998

(51) Int. Cl.[7] .................................................. G06F 15/173
(52) U.S. Cl. ............................................................ 709/224
(58) Field of Search ..................................... 709/223, 245, 709/203, 224, 201, 202

(56) References Cited

U.S. PATENT DOCUMENTS

| | | | |
|---|---|---|---|
| 5,862,325 | * | 1/1999 | Reed et al. ............................. 709/201 |
| 5,956,490 | * | 9/1999 | Buchholz et al. ..................... 709/245 |
| 6,021,439 | * | 2/2000 | Turek et al. ........................... 709/224 |
| 6,061,721 | * | 5/2000 | Ismael et al. .......................... 709/223 |
| 6,081,829 | * | 6/2000 | Sidana ................................... 709/203 |
| 6,088,717 | * | 7/2000 | Reed et al. ............................. 709/201 |
| 6,131,118 | * | 10/2000 | Stupek et al. ......................... 709/223 |
| 6,134,581 | * | 10/2000 | Ismael et al. ......................... 709/202 |

* cited by examiner

Primary Examiner—David Y. Eng
(74) Attorney, Agent, or Firm—Duke W. Yee; Jeffrey S. LaBaw

(57) ABSTRACT

A method of managing events in a pervasive computing client device having a browser. Upon loading of a page in a browser window, the browser issues an outstanding HTTP request to a specified port. Thereafter, upon generation of an asynchronous event on another port, the routine identifies an appropriate message and builds a response to the outstanding HTTP request. The response, which includes the message, is then delivered to the specified port, whereupon the browser renders the message to the user. Thereafter, the browser automatically re-issues the outstanding HTTP request and waits for another asynchronous event.

22 Claims, 3 Drawing Sheets

METHOD AND APPARATUS FOR MANAGING DATA PUSHED ASYNCHRONOUSLY TO A PERVASIVE COMPUTING CLIENT

BACKGROUND OF THE INVENTION

1. Technical Field

This invention relates generally to information retrieval in a computer network. More particularly, the invention relates to a generic method and apparatus for managing event data pushed asynchronously to a pervasive computing device, regardless of the type of event generator code used in the device.

2. Description of the Related Art

It is commonplace today for computer users to connect their machines to other computers, known as "servers," throughout a network. The network may be a private network, such as a corporate intranet of networked computers that is accessible only to computer users within that corporation, or it may be a public network, such as the Internet. The Internet is a vast collection of computing resources, interconnected as a network, from sites around the world. The World Wide Web (the "Web") is the Internet's multimedia information retrieval system corresponding to that portion of the Internet that uses the Hypertext Transfer Protocol ("HTTP") as a protocol for exchanging messages. HTTP is an application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives in return a document or other object formatted according to HTML. A collection of documents supported on a Web server is sometimes referred to as a Web site.

A user may connect his computer to a server using a "wireline" connection or a "wireless" connection. Wireline connections are those that use physical media such as cables or telephone lines, whereas wireless connections use media such as satellite links, radio frequency waves, and infrared waves. Many connection techniques can be used with these various media, including: using the computer's modem to establish a connection over a telephone line; using a local area network (LAN) card such as Token Ring or Ethernet; using a cellular modem to establish a wireless connection, and the like. The user's computer may be any type of computer processor having processing and communication capabilities. Traditionally, such devices include desktop, laptop and handheld computers.

Recently, however, the computer industry has sought to add computer processing and communications capabilities to devices other than what would normally be considered a traditional computer. Such devices are quite varied and include, for example, personal digital assistants (PDAs), smartphones, cellular phones, desktop screen phones, in-vehicle devices, business organizers (e.g., IBM WorkPad™, PalmPilot™, and the like), peripherals (such as printers, fax machines, and the like), handheld or palmtop computing devices, and the like. For convenience, these devices, as a class, are referred to herein as "pervasive computing" clients as they are devices that are designed to be connected to servers in a computer network and used for computing purposes regardless of their location. Typically, a pervasive computing client does not support the full function set of an HTML Windows-based client, such as a desktop or laptop computer. Thus, it is known in the art to provide pervasive computing devices with Web browser functionality according to more limited, yet specialized, markup languages. A representative example is HDML, which is the Handheld Device Markup Language.

A pervasive computing client must have some mechanism for informing the device user asynchronously that some event has occurred. To take a simple example, assume that a pervasive computing client device has a device driver that is responsible for managing power for the device. If the device driver notices a condition, such as a low battery, there must be some mechanism in the device for driving the message to the device display. As another example, assume the pervasive computing client is a smartphone having a paging capability. When a page arrives at the device, there must be some mechanism in place for notifying the user that a page has been received as well as providing a way for the user to dismiss the message.

The problem of notifying a user of an asynchronous event has been solved in the past using some specific application programming interfaces (APIs) and then making specific graphics engine calls to present the information to the user. This approach requires programming to a specific operating system graphics engine. Pervasive computing clients, however, are quite varied and support many different types of event generation code (e.g., Java, native code, device drivers, and the like). Thus, known operating system-specific solutions are not satisfactory.

BRIEF SUMMARY OF THE INVENTION

It is a primary object of this invention to manage event data in a pervasive computing client device.

It is another primary object of this invention to provide a generic framework for pushing event messages to users of pervasive computing clients irrespective of the underlying event generation code type (e.g., Java, native code or the like) on which the device is built.

It is a more specific object of the present invention to drive an event message to the Web browser of a pervasive computing client device.

A more particular object of this invention is to provide event messages on a Web browser of a computing device without programming to a specific operating system graphics engine or programming API.

Still another object of the present invention is to provide a event management mechanism that is portable to various pervasive computing client devices.

A more general object of this invention is to provide a pervasive computing client device with a generic mechanism for informing the device user asynchronously that some event has occurred.

Yet another object of this invention is to provide such an event manager for a pervasive computing device that does not consume large amounts of system resources and that works with a standard browser that supports HTML and scripting languages (e.g., Javascript).

These and other objects of the invention are realized in the invention by a method of managing events in a pervasive computing client device having a browser. The method is preferably implemented in computer software executing on the device. In particular, upon loading of a page in a browser window, the browser issues an outstanding HTTP request to a specified HTTP port. Thereafter, upon generation of an asynchronous event on another port, the routine identifies an appropriate message and builds a response to the outstanding HTTP request. The response, which includes the message, is then delivered to the specified port, whereupon the browser renders the message to the user. Thereafter, the browser automatically re-issues the outstanding HTTP request and waits for another asynchronous event.

Thus, according to the invention, the device's control over the initial page allows the opportunity to hide (or inject) an outstanding HTTP request on a specific HTTP port. This outstanding request is later satisfied by an event manager component of the present invention that is listening on that specific HTTP port when an event occurs. As an event occurs, appropriate text or image data is presented to the user, i.e. sent as a response to the request, regardless of what application the user may be currently using on the device. This event manager component listens on other specific HTTP ports for the actual events themselves (e.g., battery low warning, page message, vehicle warning, etc.). Each response (e.g., text or image) that is presented to the user preferably also reestablishes the outstanding HTTP request.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figures 1, 2:
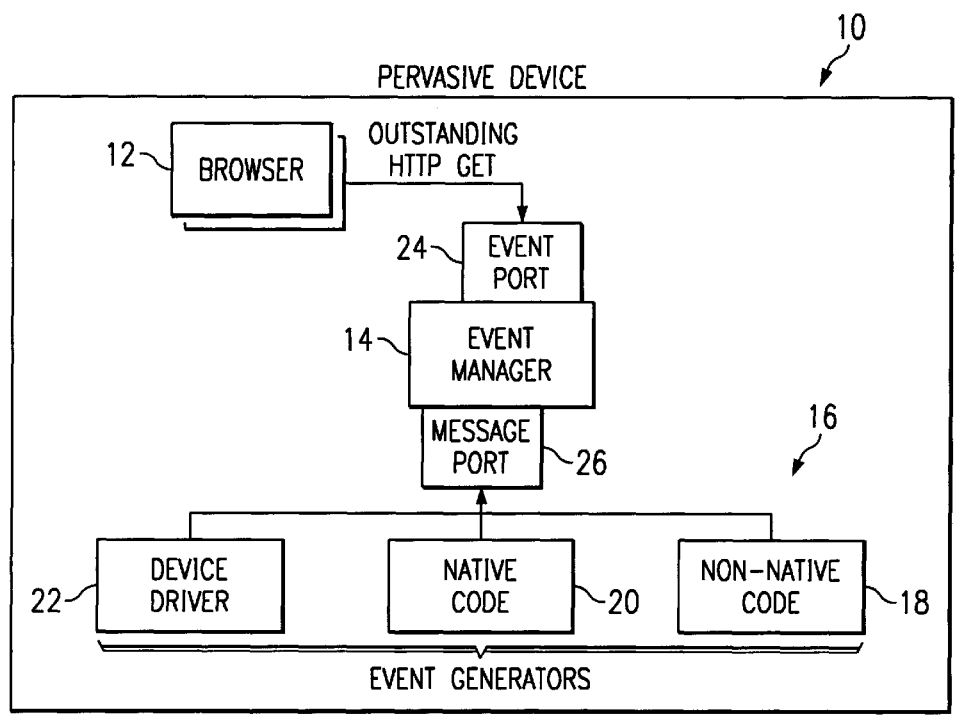
FIG. 1 is a representative event model for a pervasive computing client device according to the present invention.
FIG. 2 is a process flow state table for the event handling scheme of the present invention.

An event model for a pervasive computing client device 10 of the present invention is illustrated in FIG. 1. There are three (3) primary components: a browser 12, an event manager 14, and a set of event generators 16. The event generators 16 comprise non-native code (written, e.g., in Java) 18, platform-dependent native code 20 and device drivers 22. As will be seen, the event manager 14 has an event port 24 and a message port 26 associated therewith.

Java, originally developed by Sun Microsystems, is a collection of programming components that create a standard, platform-independent programming and runtime environment. The non-native code 18 thus typically comprises Java class libraries. Native code 20 is usually a function written in "C" or "C++" programming language and that is not portable across different operating platforms without recompilation. The Java code 18, native code 20 and device driver code 22 generate event information in specified, yet unlike, formats.

An event generator for a given pervasive computing client device may be built around any of these particular code types. A given pervasive computing client typically has a set of one or more event generators all built around the same code type or a combination of all of the code types. As will be seen, the event management framework of the present invention provides a generic mechanism that drives event messages to the display without having to rewrite messages regardless of the type of pervasive computing client or the type of code (non-native, native or device driver) that generates the event in question on such a device. This mechanism takes advantage of an existing HTTP infrastructure, for example, associated with a browser.

FIG. 2 illustrates a representative event flow table provided by the above-described components of the present invention. As can be seen, each of the primary components, namely, the browser 12, the event manager 14 and an event generator 16, has a given operating state as represented by the states set forth in the respective columns of the table. The operating states flow from top to bottom. Thus, the routine begins when the event manager 14 loads. At this point, the event port 24 and the message port 26 are created. The next state is when the browser 12 loads a local page in a separate window. According to the invention, this operation issues an outstanding HTTP GET request (e.g., an HTTP GET request) on a specified port. Thereafter, the event manager framework is in a wait state, waiting for the generation of a particular event. Preferably, the specified port is an HTTP port, for example, associated with a TCP/IP protocol. Other connections (e.g., a socket) may be used if the client supports alternate connection types.

The type and character of a given event, of course, depends on the pervasive computing client. Thus, for example, if the pervasive computing client is a pager, an event is the receipt of a page. If the pervasive computing client is a personal digital assistant, the event may be a battery low warning. If the client is an in-vehicle monitor, the event may be the existence of a particular monitored event (e.g., a tire going flat).

Assume now that some given event has now occurred. At this point, the event generator 16 sends an event message to the message port 26. The event manager 14 then processes the message to decide which message is to be rendered to the user. Thereafter, the event manager 14 builds a response to the outstanding HTTP request and delivers the response to the browser via the event port 24. The browser 12 renders the message and then re-issues the outstanding HTTP request on the specified port. Process control then cycles back to wait for the event generator to send a next message to the message port.

Thus, the control over the initial page rendered on the browser provides the opportunity to hide (or inject) an outstanding HTTP GET request on a specific (or "first") HTTP port. This outstanding request is satisfied by the event manager component of the present invention that is listening on that specific HTTP port when an event occurs. As events occur, appropriate responses are presented to the user, i.e. sent as a response to the outstanding request, regardless of what application the user may be currently using on the device. According to the invention, the event manager component 14 listens on other specific HTTP ports for the actual events generated by the event generators 16. According to the invention, each response that is presented to the user also reestablishes the outstanding HTTP request on the original HTTP port so that the event manager is always primed to drive the event information to the glass (namely, the browser display).

Figure 3:
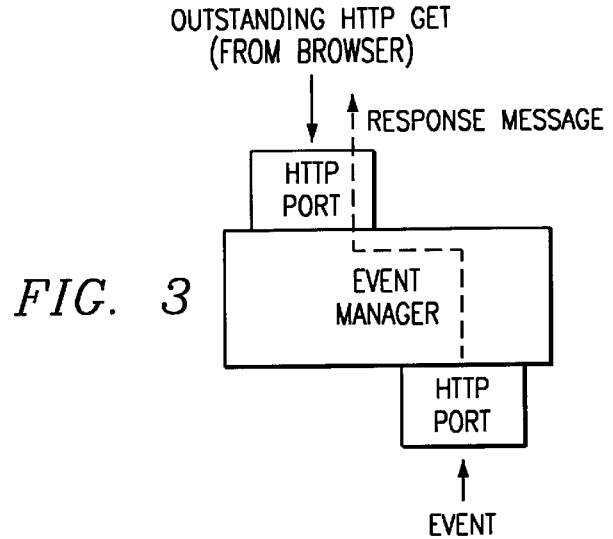
FIG. 3 is a simplified block diagram illustrating the event manager and its event and message ports.

Thus, according to the invention, and as illustrated in FIG. 3, the event port 24 corresponds to the specific HTTP port on which the outstanding HTTP request is issued, while the message port 26 corresponds to other specified HTTP port(s) on which events are generated. As noted above, as an event occurs, it is evaluated by the event manager to determine which message is to be rendered to the user on the display. The event manager then builds a response to the outstanding HTTP request on the event port 24 and delivers the response to the browser via this port. After the message is driven to the glass and rendered, the browser re-issues the outstanding HTTP request and the process cycles.

One of ordinary skill will appreciate that there may be more than one message port. For example, if a priority scheme were implemented, there might be a first message port for receiving events of a first priority, and a second message port for receiving events of a second priority. As yet another alternative, messages may be segregated by class (or some other given metric), in which case there would be a message port/class. If desired, event generators in the pervasive computing client may register with the event manager. Further, a given pervasive computing client may implement a rule set for determining what actions are taken upon the event manager's receipt of a given event.

Figure 4:
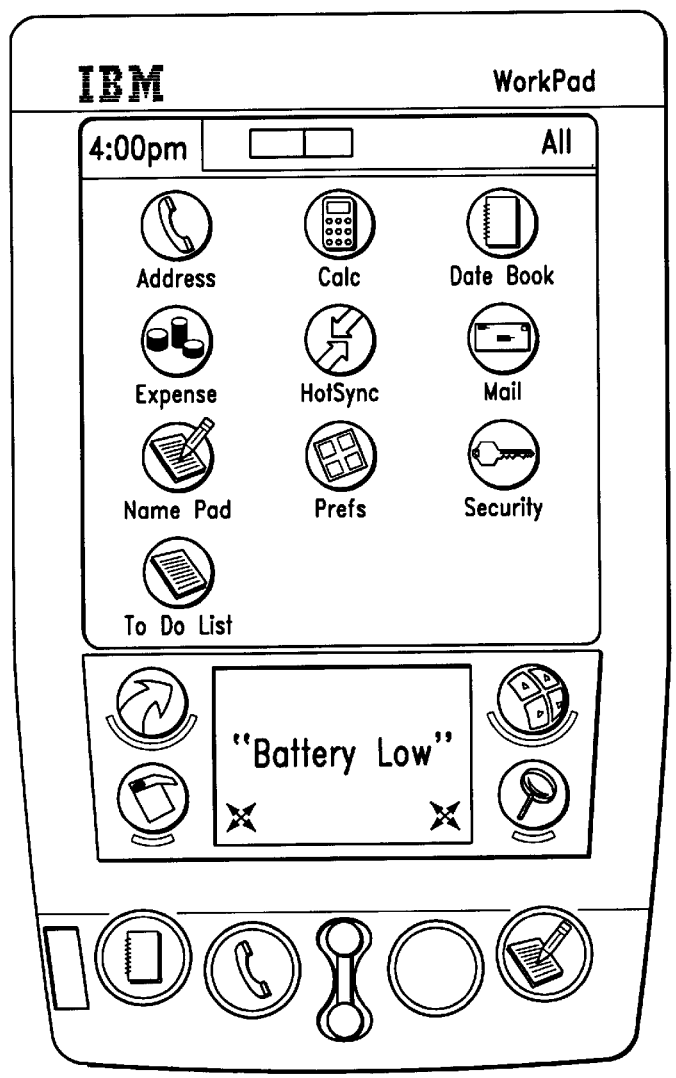
FIG. 4 is a representative pervasive computing client device displaying a message generated according to the inventive event management framework.

FIG. 4 illustrates a representative pervasive computing client device. This device is a handheld device marketed by the IBM Corporation under the WorkPad trademark. This device includes a device driver that generates various power management warnings. As seen in this example, the pervasive computing client has a browser. According to this illustrative example, a "battery low" warning message is being displayed on the browser even though the device is busy executing another application.

One of ordinary skill in the art will appreciate that the above-described event mechanism provides generic support for driving events to a browser in a pervasive computing client irrespective of whether the event generator is written in Java, C or C++ native code or some specialized device driver. Thus, unlike the prior art, where a browser in a pervasive device could not easily see or manage asynchronous events, the event model framework of the present invention enables events to be driven to the glass without having to be rewritten. Moreover, the framework is not tied to a specific operating system graphics engine or API.

Figure 5:
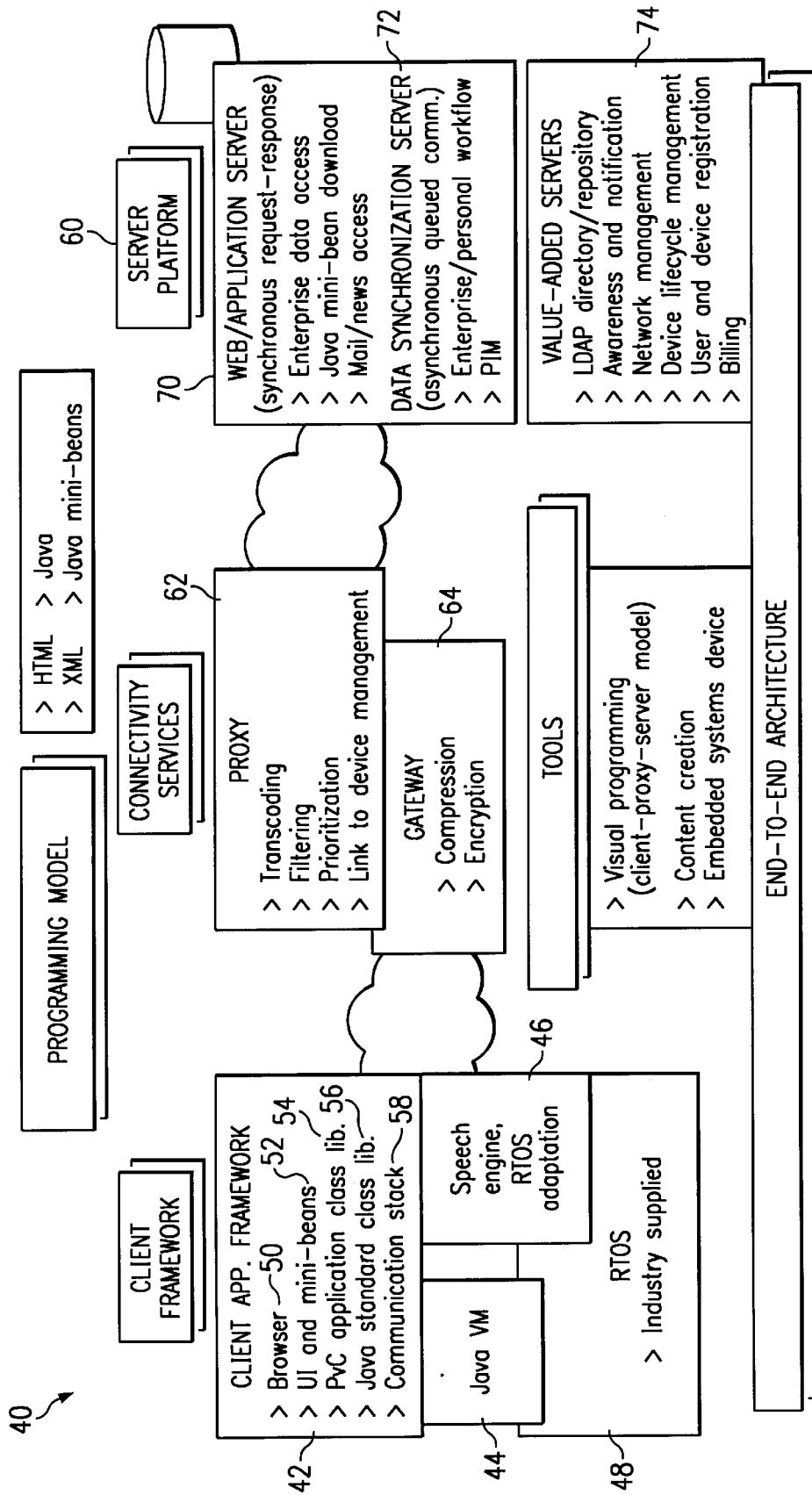
FIG. 5 is a diagram of a representative client-server architecture in which the pervasive computing client of the present invention is used.

FIG. 5 illustrates a representative client-server architecture in which the pervasive computing client device is used. The pervasive computing client stack 40 comprises a number of components, namely, a client application framework 42, a virtual machine 44, a speech engine 46, and an industry-supplied runtime operating system (RTOS) 48. The client application framework 42 includes a browser 50, a user interface 52, a pervasive computing client application class library 54, a standard Java class library 56, and a communication stack 58. The pervasive computing client connects to a server platform 60 via a connectivity service 62.

At its lower level, the connectivity service 62 includes a gateway 64 that provides compression and encryption functions. The upper level of the connectivity service 62 is a proxy 66 that provides several different functions: transcoding, filtering, prioritization and link to device management. Transcoding refers to the translation from one source markup language to another markup language. As noted above, the pervasive computing client normally does not support the full function set of an HTML Windows-based client. In such case, it is necessary to transcode the HTML-based file into a format (e.g., HDML or handheld device markup language) compatible with the pervasive client computing device so that the file may be appropriately rendered on the client.

The server platform 60 may be of several different types. The platform 60 may be a Web/application server 70 (a synchronous request-response type server) or a data synchronization server 72 (an asynchronous queued communication type server) The basic functions are each such server type are illustrated. Alternatively, the platform 60 may be a value-added server 74 that provides additional services such as LDAP directory/repository, awareness and notification, network management, device life cycle management, user and device registration, or billing.

The particular server type is not a limitation of the present invention. It is merely one of a plurality of servers which are accessible by clients, one of which is illustrated by the pervasive computing client having a browser, as previously noted. A representative Web server is an IBM RS/6000 server comprising a PowerPC® processor, the AIX® operating system and a Web server program, such as Netscape Enterprise Server. A representative server also includes a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions or the like.

A representative pervasive computing client is x86-, PowerPC®- or RISC-based, includes a runtime operating system such as WindRiver VXWorks™, QSSL WNX4™, or Microsoft Windows CE, and includes a Web browser.

The inventive functionality of the pervasive computing client is implemented in software executable in a processor, namely, as a set of instructions (program code) in a code module resident in the random access memory of the computer. Until required by the computer, the set of instructions may be stored in another computer memory, for example, in a hard disk drive, or in a removable memory, or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a pervasive computing "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by Letters Patent is set forth in the following claims:

1. A method of managing events in a pervasive computing client having a browser, comprising the steps of:

upon loading of a page in the browser, having the browser issue an outstanding HTTP request;

upon generation of an asynchronous event, delivering a response to the outstanding HTTP request, the response including a message to be posted on the browser; and rendering the message on the browser.

2. The method as described in claim 1 further including the step of having the browser re-issue the outstanding HTTP request after the message is rendered.

3. The method as described in claim 2 wherein the HTTP request is a GET request.

4. The method as described in claim 1 further including the step of selecting the message from a set of messages as a function of the asynchronous event.

5. The method as described in claim 1 wherein the browser loads the page in a separate window.

6. The method as described in claim 1 wherein the asynchronous event is generated by native code.

7. The method as described in claim 1 wherein the asynchronous event is generated by non-native code.

8. The method as described in claim 1 wherein the asynchronous event is generated by a device driver.

9. A method of managing events in a pervasive computing client having a browser, comprising the steps of:

(a) upon loading of a page in a browser window, having the browser issue an outstanding HTTP request;

(b) upon generation of an asynchronous event, identifying a message to be posted on the browser;

(c) delivering a response to the outstanding HTTP request, the response including the message;

(d) rendering the message on the browser; and (e) having the browser re-issue the outstanding HTTP request to wait for a next asynchronous event.

10. The method as described in claim 9 further including the step of repeating steps (b)–(e) upon the occurrence of another asynchronous event.

11. The method as described in claim 9 wherein the message is identified from a set of messages as a function of the asynchronous event.

12. The method as described in claim 9 wherein the asynchronous event is generated by a native code event generator.

13. The method as described in claim 9 wherein the asynchronous event is generated by a non-native code event generator.

14. The method as described in claim 9 wherein the asynchronous event is generated by a device driver.

15. In a pervasive computing client device having a browser, the improvement comprising:

means operative upon loading of a page in a browser window for controlling the browser to issue an outstanding HTTP request to a first HTTP port;

means responsive to generation of an asynchronous event on a second HTTP port for delivering a response to the outstanding HTTP request, the response including a message to be posted on the browser; and means responsive to rendering of the message on the browser for controlling the browser to re-issue the outstanding HTTP request on the first HTTP port.

16. A pervasive computing client, comprising:

a processor;

a browser;

means operative upon loading of a page in a browser window for issuing an outstanding HTTP request to a first HTTP port;

means responsive to generation of an asynchronous event on a second HTTP port for delivering a response to the outstanding HTTP request, the response including a message to be posted on the browser; and means responsive to rendering of the message on the browser for re-issuing the outstanding HTTP request on the first HTTP port.

17. A computer program product in a computer-readable medium for use in a pervasive computing client device having a browser, comprising:

means operative upon loading of a page in a browser window for issuing an outstanding HTTP request to a first HTTP port; and means responsive to generation of an asynchronous event on a second HTTP port for delivering a response to the outstanding HTTP request, the response including a message to be posted on the browser.

18. The computer program product as described in claim 17 further including:

means responsive to rendering of the message on the browser for re-issuing the outstanding HTTP request on the first HTTP port.

19. The computer program product as described in claim 17 wherein the pervasive computing client includes native code for generating the asynchronous event.

20. The computer program product as described in claim 17 wherein the pervasive computing client includes non-native code for generating the asynchronous event.

21. The computer program product as described in claim 17 wherein the pervasive computing client includes a device driver for generating the asynchronous event.

22. A method for managing events in a pervasive computing client device having a browser, comprising the steps of:

hiding an outstanding HTTP request on a first HTTP port;

upon occurrence of an event on a second HTTP port, generating a response to the outstanding HTTP request, the response including a message; and rendering the message on the browser.

* * * * *

UNITED STATES PATENT AND TRADEMARK OFFICE
CERTIFICATE OF CORRECTION

PATENT NO. : 6,272,542 B1
DATED : August 7, 2001
INVENTOR(S) : Barnes et al.

It is certified that error appears in the above-identified patent and that said Letters Patent is hereby corrected as shown below:

<u>Column 4,</u>
Line 37, "TCP/TP" should be -- TCP/IP --.

Signed and Sealed this

Fifth Day of March, 2002

*Attest:*

JAMES E. ROGAN
*Attesting Officer*     *Director of the United States Patent and Trademark Office*